United States Patent [19]
Polacinski

[11] Patent Number: 5,139,411
[45] Date of Patent: Aug. 18, 1992

[54] APPARATUS FOR REDUCING WEAR ON MOLD EJECTION SYSTEMS

[76] Inventor: Michel C. Polacinski, P.O. Box 67 County Rte. 9, West Lebanon, N.Y. 12195

[21] Appl. No.: 678,126

[22] Filed: Apr. 1, 1991

[51] Int. Cl.$^5$ .............................................. B29C 45/40
[52] U.S. Cl. ..................................... 425/556; 264/334; 425/444
[58] Field of Search ............... 425/139, 554, 556, 444; 264/334, 336

[56] References Cited

U.S. PATENT DOCUMENTS

| | | | |
|---|---|---|---|
| 3,213,490 | 10/1965 | Johnson | 425/444 |
| 3,572,424 | 3/1971 | Byrne | 164/347 |
| 3,687,591 | 8/1972 | Perego | 425/249 |
| 3,726,625 | 4/1973 | Rees | 425/556 |
| 4,555,086 | 11/1985 | Kiyotomo | 425/556 |
| 4,732,554 | 3/1988 | Hellmann | 425/139 |
| 4,865,536 | 9/1989 | Inaba et al. | 425/556 |
| 4,891,002 | 1/1990 | Inaba et al. | 425/566 |
| 4,929,170 | 5/1990 | Boskovic | 425/556 |

Primary Examiner—Tim Heitbrink
Attorney, Agent, or Firm—Heslin & Rothenberg, P.C.

[57] ABSTRACT

An apparatus for reducing wear on the ejection system components of a molding system utilizes a mounting plate supporting a limit bolt connected to the ejection system. A spring is used to create a force on the limit bolt which acts to reduce the friction on the ejection system components. By varying the tension of the screw, the tension of the spring and the force on the ejection system can be varied. The bolt may be mounted on a roller bearing means to allow the force be applied during operation of the ejection system.

16 Claims, 6 Drawing Sheets

APPARATUS FOR REDUCING WEAR ON MOLD EJECTION SYSTEMS

BACKGROUND OF THE INVENTION

This invention relates to the field of molding systems and more particularly to an apparatus for reducing wear of the mold components and ejection system components.

The typical injection molding system contains a mold having a top half and a bottom half which are capable of being opened and closed during a molding cycle to create an article of manufacture. As is well known in the art, when the mold is closed, a material used to manufacture the article such as plastic, is injected into the mold where it is allowed to cool and set into its desired shape. Subsequently, the mold will open and the article will be ejected from the inside of the mold by an ejection system. The ejection system typically comprises one or more ejection plates having knockout pins and pushback pins affixed thereon. The knockout pins and pushback pins are oriented and sized to be insertable within bores when the ejection system is operating. After an article of manufacture has been cooled, the mold is opened and an ejection system press then pushes the ejection plates in a direction towards the mold plates. The pushback pins and knockout pins are inserted through the bores within the bottom plate. As the knockout pin is translated through its corresponding bore it contacts and forces the article of manufacture out of the mold. As the mold closes, the ejection plate is translated in the opposite direction such that the knockout pin is retracted towards its original position. The process is then repeated for each additional molding cycle.

Molding systems may weigh between 100 and 10,000 pounds depending upon the size of the article of manufacture. Accordingly, there is a substantial amount of friction associated with the knockout pins and pushback pins as they slide through the bores. This is particularly true if a mold is run in the horizontal direction because the weight of the ejection system is supported by the pushback pins. However, even molding systems run in a vertical direction are effected by friction and wear. A molding system may run continuously for days only to be stopped for repairs. Since repair of worn parts is often a lengthy and costly process, it is desireable to reduce the wear on the mold and ejection system components. By reducing wear the amount of molding time lost during down time necessary to effectuate repairs would be minimized thereby increasing productivity. Accordingly, the wear on the components of a molding system, particularly the pushback pins and knockout pins of ejection systems has been a longstanding problem in the molding art.

It is therefore an object of the present invention to create an apparatus which will reduce friction created by operation of a typical reciprocating ejection system.

It is also an object of the present invention to reduce wear on the ejection system components including knockout pins and pushback pins thereby increasing mold operation time.

It is also an object of the present invention to provide a system to reduce wear on an ejection system which may be used in either a vertical or horizontal position.

SUMMARY OF THE INVENTION

The aforementioned objects, advantages and features of the invention may be achieved through implementation of the apparatus for reducing wear on ejection system components in accordance with the present invention.

The apparatus includes a means for fastening the ejection system to a mold system, a means for applying a force to the ejection system in a direction substantially perpendicular to the direction of translation of the ejection plate, and means for allowing the force to be continuously applied to the ejection system while the ejection plate is translated. The means for fastening the ejection system to the mold system may include a mounting plate affixed to the mold and a limit bolt, insertable through a slot in the mounting plate and fastened to the ejection plate. The means for applying a force to the ejection system in a direction substantially perpendicular to the direction of translation for the ejection plate may include a spring mounted between a retaining means on the limit bolt and the mounting plate. The means for allowing the force to be continuously applied to the ejection system while the ejection plate is translated may include a roller bearing means located between the spring and the mounting plate. The roller bearing means may include a plurality of rollers within a cage and a riding plate oriented such that the rollers are between the mounting plate and the riding plate, the spring being in contact with the top side of the riding plate to allow the mounting plate, rollers and riding plate to reduce friction in the ejection system. The limit bolt may be threadedly engaged to the ejection plate.

The apparatus for reducing wear on ejection system components may also be summarized as including a mounting plate, affixed to the mold plate, having a slot therein extending in a direction parallel to the direction of translation of the ejection plate, a fastening means insertable through the slot and affixed to the ejection plate for supporting the ejection plate to the mounting plate, means for applying a force on the fastening means and the ejection plate relative to the mounting plate, and means for allowing the fastening means to slide in the direction of translation of the ejection plate. The apparatus may also include a means for adjusting the force on the fastening means and ejection plate relative to the mounting plate. The fastening means may comprise a limit bolt and a means for applying the force may include a spring mountable between the limit bolt and mounting plate. The means for allowing the fastening means to slide in the direction of translation of the ejection plate may include a plurality of rollers oriented within a cage having an aperture therethrough and a riding plate having an aperture therethrough set upon the rollers within the cage such that the limit bolt is insertable through the spring, the aperture of the riding plate, the aperture of the cage, the slot within the mounting plate and threaded into the ejection plate to create a low friction rolling system thereby allowing the bolt to roll in a direction of translation of the ejection plate.

The invention may also comprise a combination mold and reduced friction ejection system which includes a mold having an end plate, a parallel plate, a first half plate, and a second half plate, an ejection plate having knockout pins protruding therefrom in a direction coaxial with bores extending within the second half plate thereby enabling the pins to be inserted into the corresponding bores as the ejection plate is translated towards the first half plate. The mounting plate may have a slot therein affixed to the end plate and parallel plates such that the slot extends in the direction in which the ejection plate may be translated. The reduced friction ejection system includes a limit bolt threadably engageable with the ejection plate and insertable through the slot of the mounting plate, a plurality of rollers within a cage oriented below a riding plate to create a roller bearing, and a spring mounted between the riding plate and the head of the limit bolt to apply force onto the ejection plate wherein as the ejection plate is translating during the ejection step of the molding cycle, the limit bolt, spring and riding plate are translated in the same direction to continuously apply a force onto the ejection plate thereby reducing wear and friction.

The combination mold and reduced friction ejection system may be modified such that the mounting plate may be affixed to the end plate, or the mounting plate may be affixed to the end plate and a stationary plate located within the mold.

DETAILED DESCRIPTION

Figure 1:
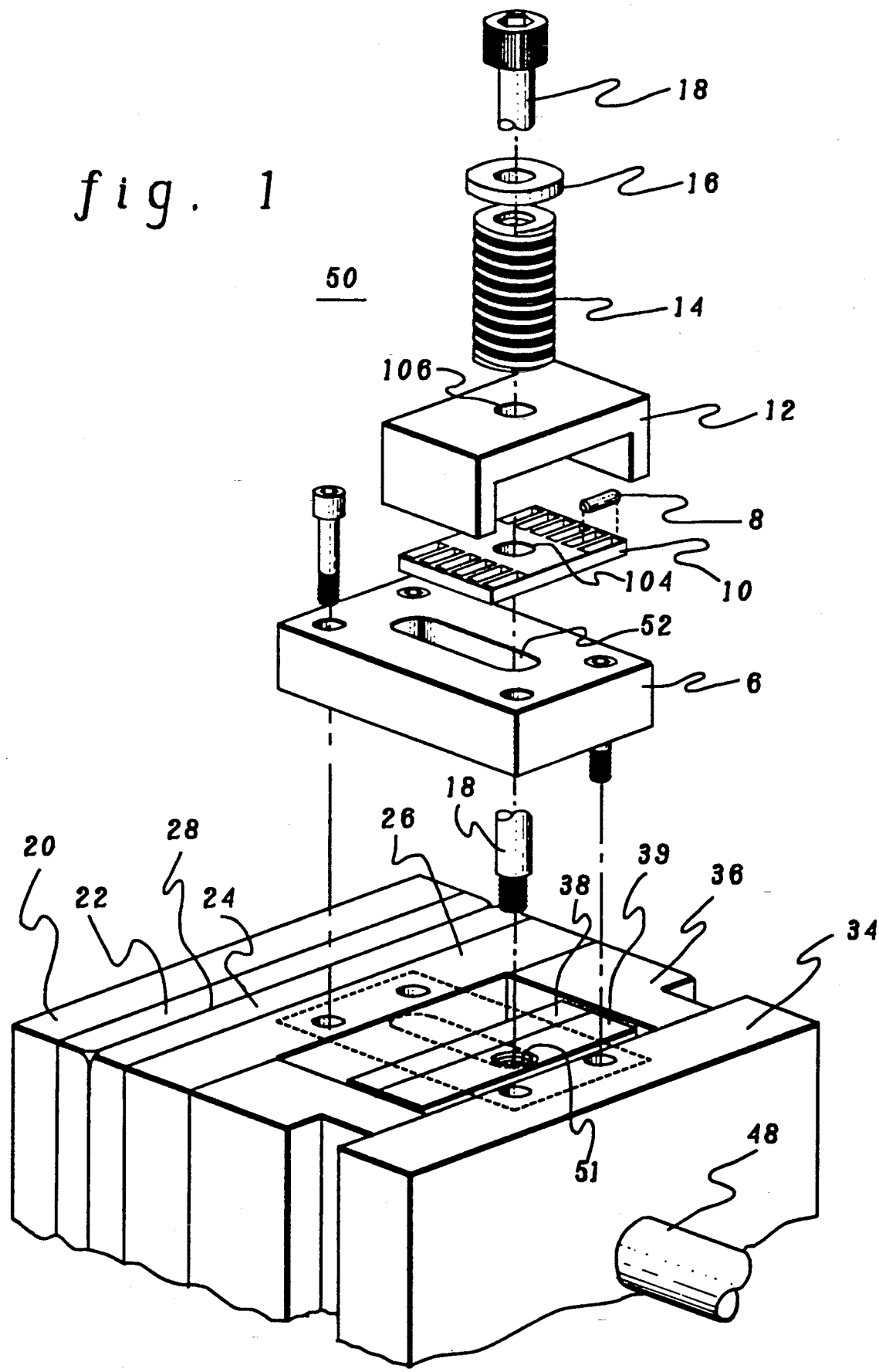
FIG. 1 is an isometric view of a mold system having a vertically positioned ejection system incorporating the apparatus for reducing wear on ejection system components.

Referring now to FIG. 1, a molding system, of the type well known in the art, contains the apparatus for reducing the wear on mold components in accordance with the present invention. The apparatus includes mounting plate 6, rollers 8, low friction cage 10, riding plate 12, spring 14, washer 16, and limit bolt 18.

Figure 2:
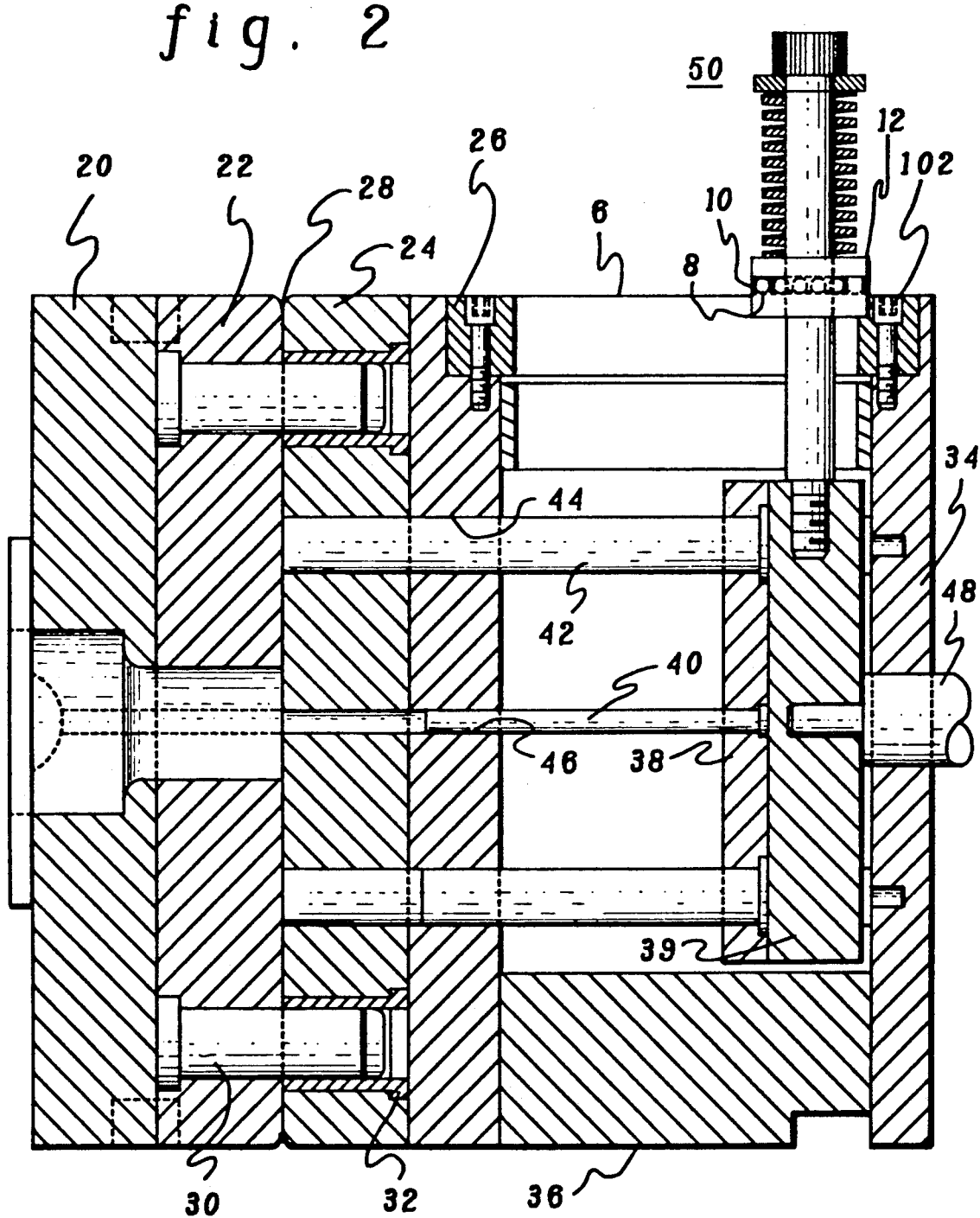
FIG. 2 is a sectional view of a mold system having a horizontally positioned ejection system including the apparatus for reducing wear on ejection system component.

A conventional guide pin type molding system having an ejection system as shown in FIG. 2 comprises a set of first half plates 20, 22 (commonly referred to as top plates) and a set of second half plates 24 and 26 (commonly referred to as bottom plates) which together comprise the mold plates. The mold plates come together when the mold is closed along a mold parting line 28. The physical mold is created between the first half plates 20, 22 and the second half plates 24, 26 within which material is molded into the desired shape during a molding cycle. The first half plates typically comprise an outer first half plate 20 and an inner first half plate 22. Guide pins 30 extend perpendicularly from the outer first half plate 22. Each guide pin is insertable into a bushing 32 located within the inner second half plate 24. Each guide pin 30 aligns the mold plates as the mold opens. The number of guide pins may vary according to mold size. For example, a relatively small size mold such as a 100 pound mold may contain two guide pins whereas a relatively large 10,000 pound mold may contain 4 guide pins and bushings. The mold system contains an end plate 34 which may be connected to two parallel plates 36 which are bolted to the outer second half plate 26 which is in turn bolted to the inner second half plate 24. Other configurations which are well known in the art may be incorporated into molding systems which may utilize the apparatus in accordance with the present invention. Therefore, use of the invention is not limited to the specific molding systems described herein.

Figure 3:
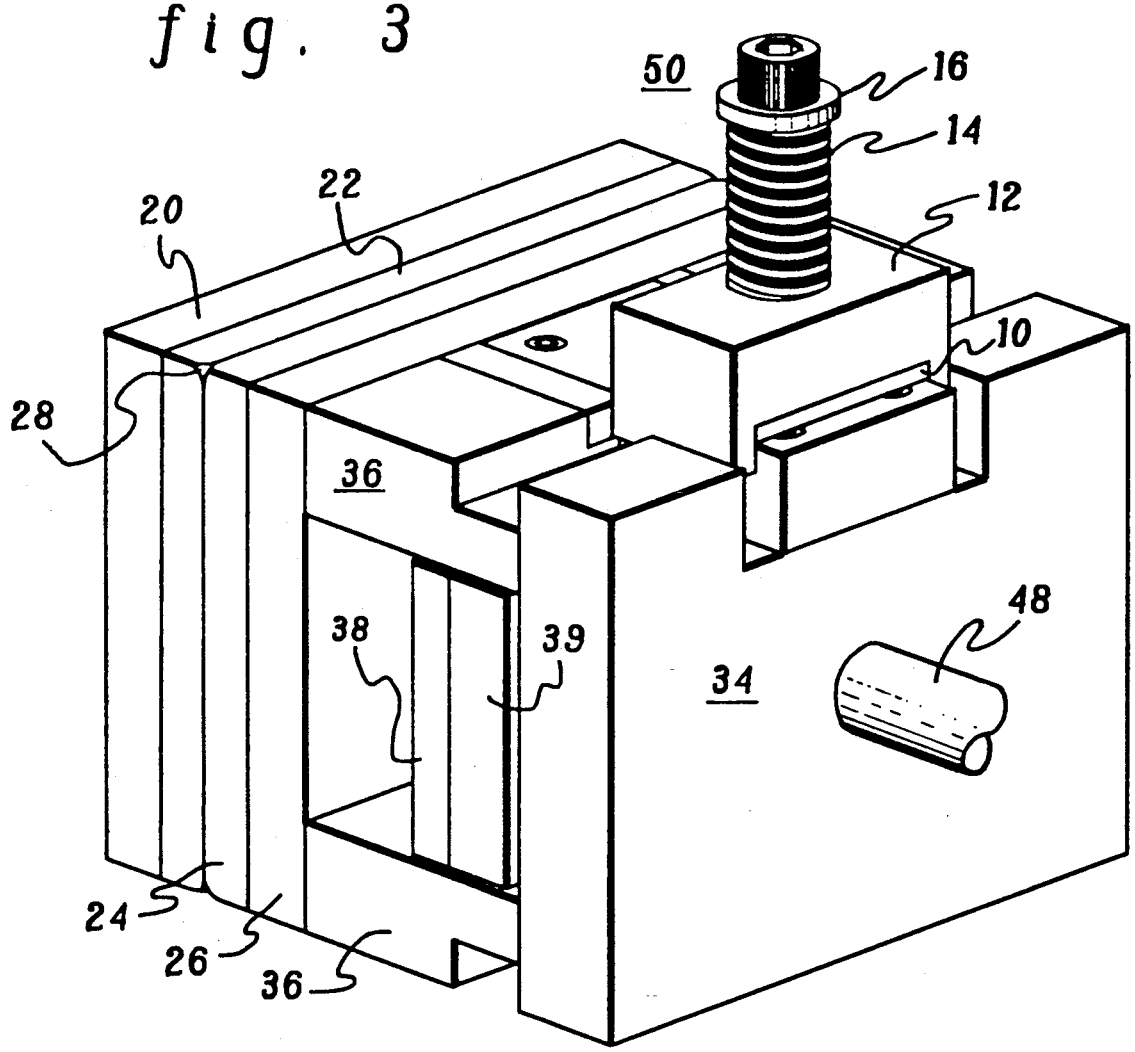
FIG. 3 is an isometric view of a molding apparatus utilizing a horizontally positioned ejection system incorporating apparatus for reducing wear on the ejection system components in accordance with the present invention.

Molding systems typically contain ejection systems which function to eject the molded article of manufacture from within the mold plates after the mold plates have opened at the end of a molding cycle. A vertically positioned ejection system is shown in FIG. 1 while a horizontally positioned ejection system is shown in FIGS. 2 and 3. Referring to FIGS. 1 and 2, molds utilizing both vertical and horizontal ejection systems include various components including one or more ejection plates 38 and 39 which are held together by bolts (not shown), a first ejection plate 38 which contains one or more knockout pins 40 and one or more pushback pins 42. The ejection plates are oriented such that the pushback pin 42 and knockout pin 40 are coaxially aligned with a corresponding pushback pin bore 44 and a corresponding knockout pin bore 46, respectively. The pushback pins 42 and knockout pin 40 are insertable into the corresponding pushback pin bore 42 and ejection pin bore 46 as the ejection plate is translated towards the first half plates 20, 22 during ejection system operation. When the molding system is run in a horizontal press, pushback pin 42 functions to support weight of the ejection plates thereby causing a substantial amount of friction on the pushback pin 42. An ejection system press pin 48 extends through the end plate 34 and into the second ejection plate 39. The ejection system press pin 48 is hydraulically activated to translate the ejection plates 38, 39 towards the mold plates 20, 22, 24, 26 as the mold is opened such that the knockout pin 40 protrudes through the knockout pin bore 46 to eject the molded article from between the first half inner plate 22 and second half inner plate 24.

Since the pushback pins 42 support the weight of the ejection system, the pushback pins are susceptible to wear due to the high friction between the pushback pins 42 and bore 44. A substantial amount of friction and wear also exists between the knockout pin 40 and its corresponding bore 46. As shown in FIGS. 1 and 2, the friction reducing apparatus 50 is affixed to the ejection system in accordance with the present invention. The apparatus 50 reduces wear on the ejection system components including the pushback pins 42, knockout pins 40 and bores 44 and 46. The friction reducing apparatus 50, in accordance with the present invention, contains a mounting plate 6 bolted to the end plate 34 and parallel plate 36. The mounting plate contains apertures on each corner and a slot 52 extending therein. The mounting plate is secured to the end plate and parallel plate by inserting cap screws 102 through the apertures and fastening the screws into threaded recesses within the plates.

A plurality of rollers 8 are contained within a low friction cage 10 designed to accommodate the rollers 8. The cage 10 is mounted to the mounting plate via an aperture 104 therein capable of receiving limit bolt 18. A riding plate 12 also containing an aperture 106 therein for receiving the same limit bolt 18 is placed on the rollers of the low friction cage and mounted such that the low friction cage and rollers are between the riding plate and mounting plate. A spring 14 is placed above the aperture 106 of the riding plate 12 and a limit bolt 18 and washer 16 are used to secure the riding plate 12 and low friction cage 10 to the mounting plate 6. The limit bolt 18 is inserted through the washer 16 and spring 14 and further inserted through the apertures of the riding plate 12, low friction cage 10, and mounting plate 6, respectively, before being threaded into a threaded aperture 51 located within the rear ejection plate 39.

When in operation, the spring 14 provides a force to the washer 16 which is transmitted into the head of the limit bolt 18 and through the limit bolt 18 into the ejection plate 39. This force acts in the direction which is substantially perpendicular to the direction of travel or translation of the ejection plates 38, 39. If the mold is run in a horizontal press, the force acts to relieve the weight of the ejection plates and ejection system thereby reducing the friction on the components including pushback pins 42 and knockout pins 40. The wear on these pins and their corresponding bores 40, 46 is therefore reduced.

Various different materials may be used to manufacture the individual parts used in the friction reducing system 50 in accordance with the present invention as depicted herein. For example, various metals, alloys and steels may be used if their strength and hardness are sufficient to accommodate the stresses incurred by these parts during operation of a molding system implementing the present invention.

Figure 6:
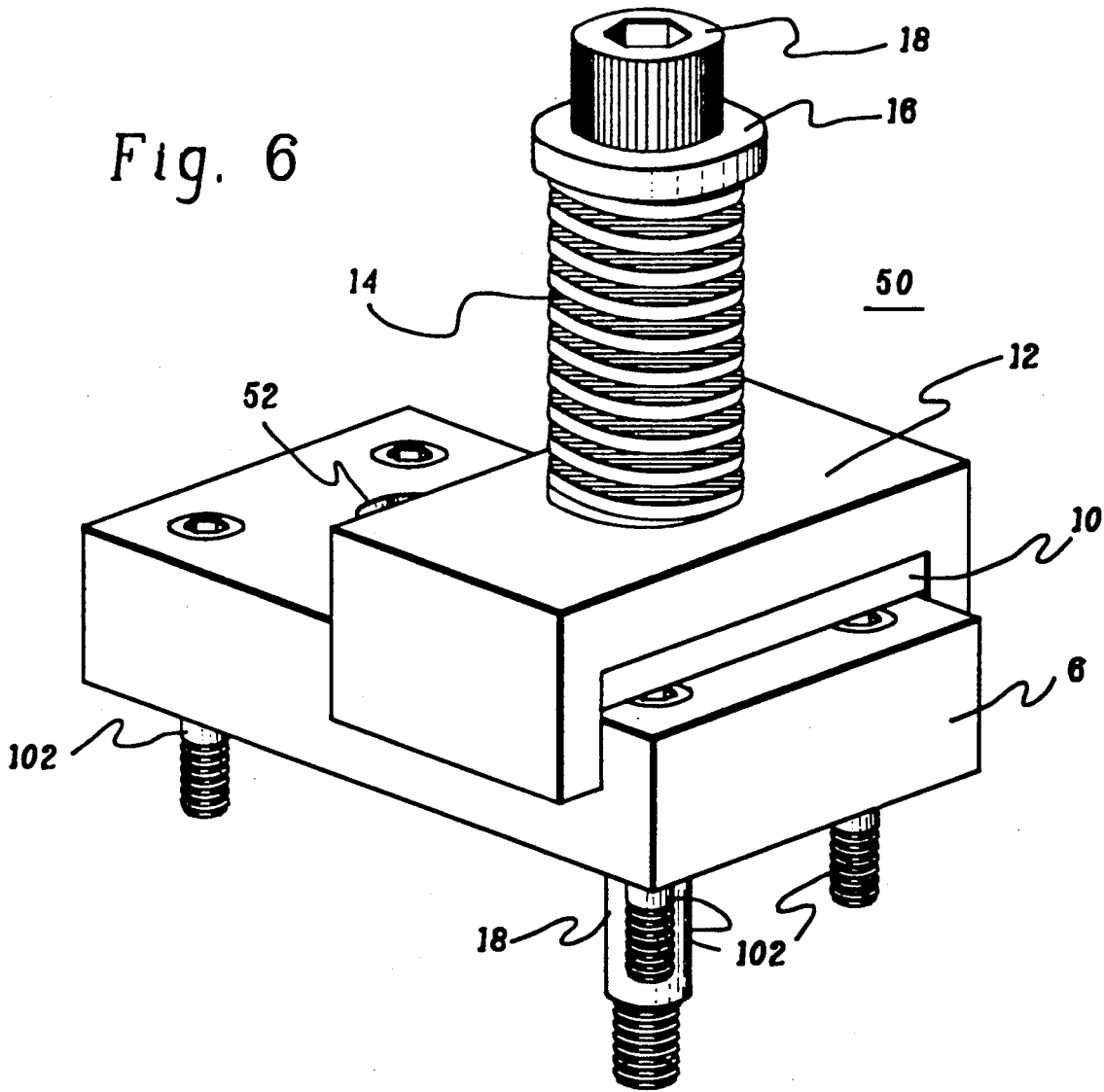
FIG. 6 is an isometric view of only the apparatus for reducing wear on ejection system components when not mounted on a molding system in accordance with the present invention.

FIG. 6, an isometric view of the friction reducing apparatus 50, more clearly shows the orientation of the mounting plate 6, rollers 8, cage 10, and riding plate 12. As shown in FIG. 6, the riding plate 12, low friction cage 10, rollers 8 and mounting plate 6 allow the force exerted by the spring 14 to be continuously applied in the same direction, (substantially perpendicular to the direction of translation of the ejection plate) while the ejection plate is translated during the ejection step of a molding cycle. As the ejection plate is translated, the limit bolt is also translated in the same direction and therefore moves through the slot 52 within the mounting plate 6. As this translation occurs, the riding plate 12 and the spring 14 and washer 16 also translate along with the limit bolt 18 over the rollers 8 until the ejection plate reaches the outer second half plate 26, shown in FIG. 2. At all positions during movement of the ejection system and corresponding translation of the limit bolt, the spring 14 continues to apply the force to the limit bolt 18 so as to reduce the friction on the pushback pins 42 and knockout pins 40.

By adjusting the thickness of washer 16, the length of the limit bolt 18 or the stiffness of the spring 14, the force on the ejection system may be varied such that the location of the pushback pins and knockout pins 40, relative to their position within the bores 44 and 46, may be altered.

Molding systems operated in a vertical press may also be equiped with the friction reducing apparatus 50 in accordance with the present invention. Although the weight of the ejection system is not completely borne by the pushback pins in such a system since gravity does not act in the direction perpendicular to the direction of translation of the ejection plates, friction is still present within the system.

Figure 4:
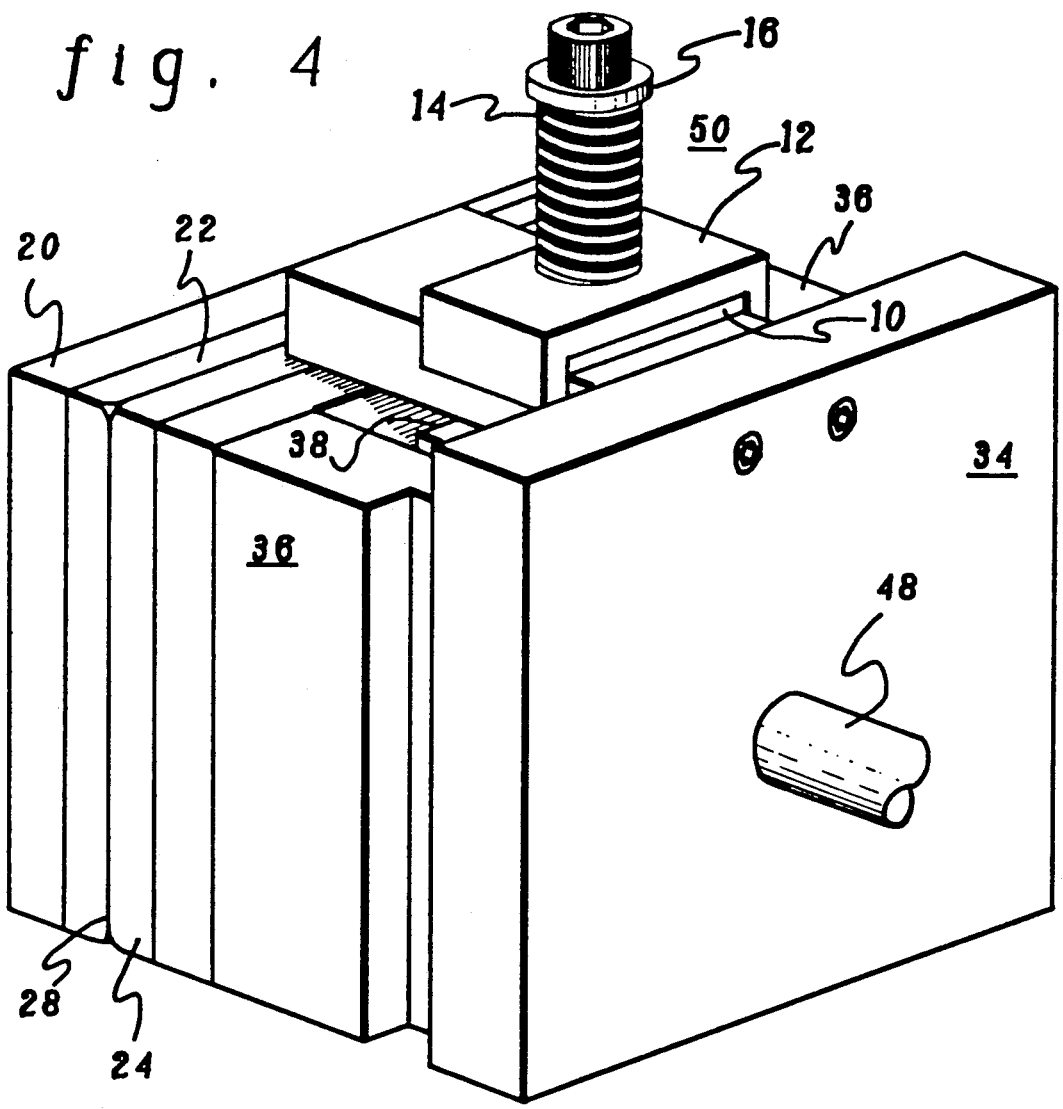
FIG. 4 is an isometric view depicting an alternate technique for mounting the apparatus for reducing wear on ejection system components onto a molding system in accordance with the present invention.

FIG. 4 depicts an alternate technique for mounting the friction reducing apparatus 50 onto a mold system having a vertically positioned ejection system. Using this technique, the apparatus is mounted such that the mounting plate 6 is bolted directly to the end plate 34 and not to a parallel plate. The limit bolt is still bolted to the rear ejection plate 39 which when translated towards the outside second half plate 26 translates the bolt 18, washer 16, spring 14, riding plate 12, cage 10, and rollers 8 along the mounting plate 6 in the direction of travel.

Figure 5:
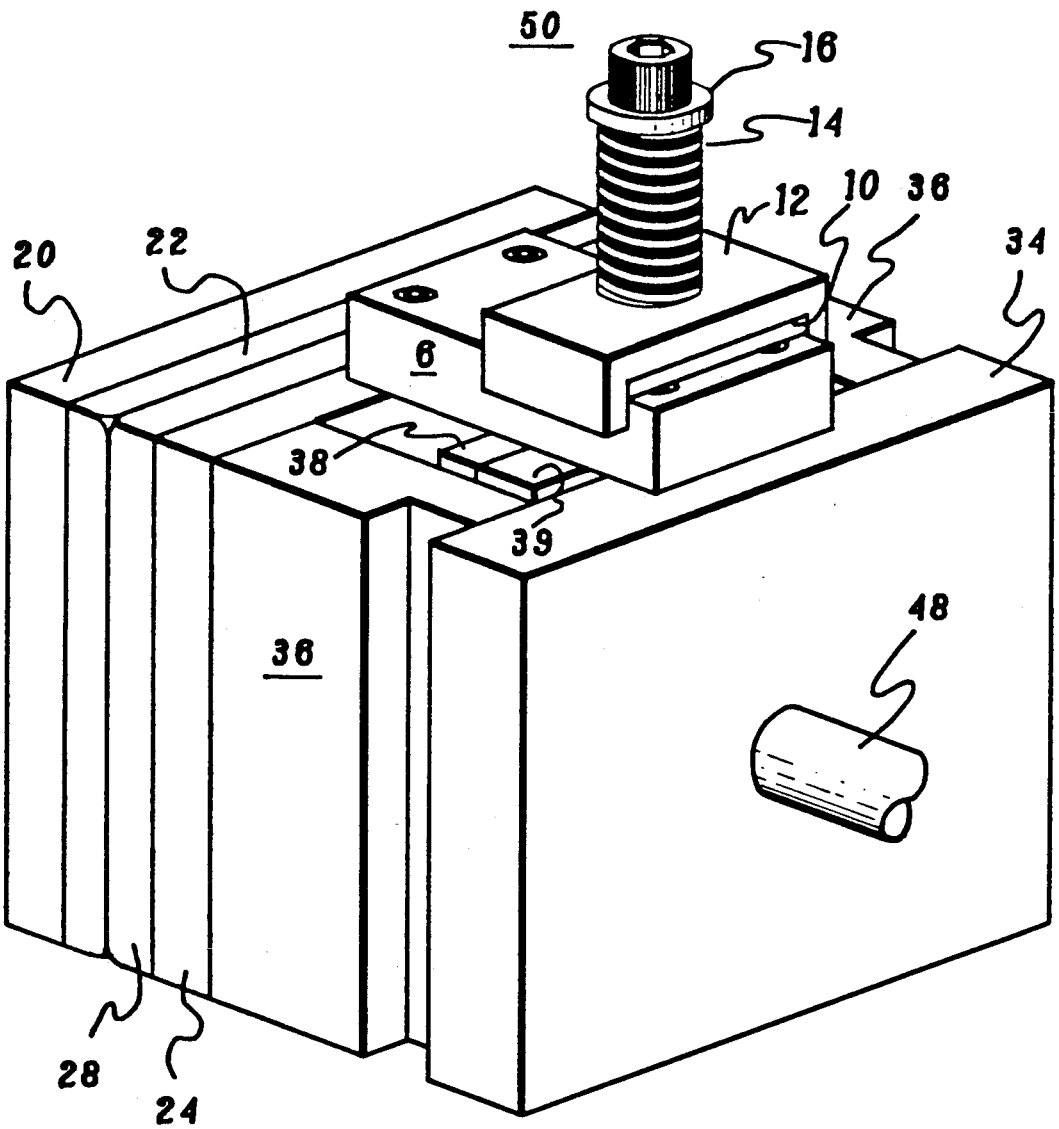
FIG. 5 is an isometric view depicting yet another alternative technique for mounting the apparatus for reducing wear on ejection system components onto a molding system in accordance with the present invention.

FIG. 5 discloses yet another technique for mounting the apparatus 50 where the mounting plate 6 is bolted to the outside second half plate 26 and end plate 34. This configuration may be used when mounting the apparatus 50 in a location of the mold where a parallel plate is not present, such as the middle of the mold or in a molding system which does not contain parallel plates. The operation of the apparatus 50 is identical to that described in the embodiment shown in FIGS. 1-4.

In larger molds, more than one friction reducing apparatus 50 may be used. Each apparatus may be mounted at different sections of the ejection plate 38 in accordance with the present invention. For example, heavy molds may require the use of three friction reducing systems 50. A separate system 50 may be placed on each side of the mold system and in the center of the mold system using either of the techniques taught in FIGS. 1, 4, or 5 to mount the friction reducing system 50 to the molding system.

Although the invention has been described in conjunction with the embodiments depicted herein including molds containing either vertical or horizontal ejection systems, it will be apparent to one skill in the art that modifications to those embodiments may be made. For example, equivalent means for fastening the ejection plate to the molding systems may be used. Also, equivalent means for applying a force on the fastening means and ejection plate may also be used as well as alternative means for allowing the fastening means to slide in the direction of translation of the ejection plate. Any such modifications, alterations, and variations are intended to be within the scope of the invention as defined by the following claims.

What is claimed is:

1. A molding apparatus having a mold comprising:
    first and second mold plates forming a mold cavity;
    at least one ejection plate having a knockout pin protruding therefrom in a direction coaxial with a corresponding bore within the second mold plate thereby enabling said knockout pin to be inserted into the corresponding bore as the at least one ejection plate is moved in a direction of translation towards the first and second mold plates;
    a mounting plate affixed to the second mold plate and positioned above the at least one ejection plate, said mounting plate having a slot therein extending in a direction substantially parallel to the direction of translation;

a fastening means inserted through the slot and affixed to the at least one ejection plate for supporting the ejection plate to the mounting plate;

force applying means located on the fastening means for applying a force substantially perpendicular to the direction of translation to reduce friction and wear of the knockout pin and the corresponding bore; and means for allowing the fastening means to slide in a direction of transition of the at least one ejection plate.

2. The molding apparatus according to claim 1 further comprising means for adjusting the force of the force applying means.

3. The molding apparatus according to claim 2 wherein the fastening means comprises a limit bolt.

4. The molding apparatus according to claim 3 wherein the force applying means comprises a spring mountable between the limit bolt and mounting plate.

5. The molding apparatus according to claim 4 wherein the means for allowing the fastening means to slide in the direction of translation of the ejection plate comprises:

a plurality of rollers oriented within a cage having an aperture therethrough and set upon the mounting plate such that the rollers are in contact with the mounting plate; and a riding plate having an aperture therethrough set upon the rollers within the cage such that the limit bolt is inserted through the spring, the aperture of the riding plate, the aperture of the cage, the slot within the mounting plate and threaded into the ejection plate to create a low friction rolling system thereby allowing the bolt to roll in the direction of translation of the ejection plate.

6. The molding apparatus of claim 1 further comprising a pushback pin protruding from said at least one ejection plate and a corresponding pushback pin bore within the second mold plate located in a direction coaxial with the pushback pin thereby enabling the pushback pin to slide through the corresponding pushback pin bore as the at least one ejection plate is moved in the direction of translation wherein the force applying means reduces friction and wear of the pushback pin and corresponding pushback pin bore.

7. A combination mold and weightless ejection apparatus comprising:

a mold having a first half plate and a second half plate forming a mold cavity, an end plate and, a parallel plate located between the second half plate and the end plate;

an ejection plate having a knockout pin protruding therefrom in a direction coaxial with a bore extending within the second half plate thereby enabling the pin to be inserted into the bore as the ejection plate is translated towards the first half plate;

a mounting plate, having a slot therein, affixed to the end plate and parallel plate such that the slot extends substantially parallel to a direction of translation of the ejection plate;

a limit bolt threadably engageable with the ejection plate and insertable through the slot of the mounting plate;

a plurality of rollers, within a cage, oriented below a riding plate and located on the mounting plate to create a roller bearing; and a spring mounted between the riding plate and a head of the limit bolt to apply a force onto the ejection plate in a direction substantially perpendicular to the direction of translation of the ejection plate wherein as the ejection plate is translated during an ejection step of a molding cycle the limit bolt, spring and riding plate are translated in the direction of translation of the ejection plate to continuously apply said force onto the ejection plate thereby reducing wear and friction between the pin and bore.

8. A combination mold and weightless ejection apparatus comprising:

a mold having an end plate, a first half plate and a second half plate;

an ejection plate having a knockout pin protruding therefrom in a direction coaxial with a bore extending within the second half plate thereby enabling the pin to be inserted into the bore as the ejection plate is translated towards the first half plate;

a mounting plate having a slot therein affixed to the end plate such that the slot extends substantially parallel to a direction of translation of the ejection plate;

a limit bolt threadably engageable with the ejection plate and insertable through the slot of the mounting plate;

a plurality of rollers, within a cage, oriented below a riding plate located on the mounting plate to create a roller bearing; and a spring mounted between the riding plate and a head of the limit bolt to apply a force onto the ejection plate in a direction substantially perpendicular to the direction of translation of the ejection plate wherein as the ejection plate is translated during an ejection step of a molding cycle the limit bolt, spring and riding plate are translated in the direction of translation of the ejection plate to continuously apply said force onto the ejection plate thereby reducing wear and friction between the pin and bore.

9. A combination mold and weightless ejection apparatus comprising:

a mold having a mold cavity comprising a first half plate opposing a stationary second half plate;

an ejection plate having a knockout pin protruding therefrom in a direction coaxial with a bore extending within the second half plate thereby enabling the pin to be inserted into the bore as the ejection plate is translated towards the first half plate;

a mounting plate having a slot therein affixed to an end plate and the stationary plate such that the slot extends substantially parallel to a direction of translation of the ejection plate;

a limit bolt threadably engageable with the ejection plate and insertable through the slot of the mounting plate;

a plurality of rollers, within a cage, oriented below a riding plate located on a mounting plate to create a roller bearing;

a spring mounted between the riding plate and a head of the bolt to apply a force onto the ejection plate in a direction substantially perpendicular to the direction of translation of ejection plate wherein as the ejection plate is translated during the ejection step of a molding cycle the bolt, spring and riding plate are translated in the same direction to continuously apply said force onto the ejection plate thereby reducing wear and friction.

10. A molding apparatus including at least one mold plate and an ejection system having an ejection plate, an ejection rod, at least one pushback pin and at least one knockout pin, said molding apparatus having an apparatus for reducing wear on the at least one pushback pin and the at least one knockout pin comprising:

means for applying a force to the ejection system in a direction substantially perpendicular to a direction of translation of the ejection plate; and means for allowing the force to be continuously applied to the ejection system while the ejection plate is translated.

11. The molding apparatus according to claim 10, wherein the means for applying a force to the ejection system in a direction substantially perpendicular to a direction of translation of the ejection plate comprises:

a mounting plate affixed to the mold plate; and a limit bolt insertable through a slot on the mounting plate and fastened to the ejection plate.

12. The molding apparatus according to claim 11 wherein the means for applying a force to the ejection system in a direction substantially perpendicular to the direction of translation of the ejection plate comprises a spring mounted between a retaining means on the limit bolt and the mounting plate.

13. The molding apparatus according to claim 12, wherein the means for allowing the force to be continuously applied to the ejection system while the ejection plate is translated comprises a roller bearing means located between the spring and the mounting plate.

14. The molding apparatus according to claim 13 wherein the roller bearing means comprises a plurality of rollers within a cage and a riding plate oriented such that the rollers are between the mounting plate and riding plate, said spring being in contact with a topside of the riding plate to allow the mounting plate, rollers and riding plate to reduce friction on the ejection system.

15. The molding apparatus according to claim 4 wherein the limit body is threadably engaged to the ejection plate such that the force may be varied by varying the length of the limit bolt.

16. The molding apparatus according to claim 15, wherein the mounting plate is bolted to said at least one mold plate.

* * * * *

UNITED STATES PATENT AND TRADEMARK OFFICE
CERTIFICATE OF CORRECTION

PATENT NO. : 5,139,411

DATED : August 18, 1992

INVENTOR(S) : Polacinski, Michel C.

It is certified that error appears in the above-indentified patent and that said Letters Patent is hereby corrected as shown below:

Column 7, line 10, "transistion" should be --translation--;

Column 10, line 16, "4" should be 0014--.

Signed and Sealed this

Seventh Day of September, 1993

*Attest:*

BRUCE LEHMAN

*Attesting Officer*     *Commissioner of Patents and Trademarks*